United States Patent
Levy et al.

(10) Patent No.: US 8,958,321 B2
(45) Date of Patent: Feb. 17, 2015

(54) POWER MANAGEMENT OF USER EQUIPMENT LOCATED ON A FEMTOCELL BASE STATION

(75) Inventors: Sharon Levy, Hadera (IL); Felix Gess, Hod-Hasharon (IL)

(73) Assignee: Broadcom Corporation, Irvine, CA (US)

(*) Notice: Subject to any disclaimer, the term of this patent is extended or adjusted under 35 U.S.C. 154(b) by 380 days.

(21) Appl. No.: 13/363,593

(22) Filed: Feb. 1, 2012

(65) Prior Publication Data

US 2012/0201157 A1 Aug. 9, 2012

(30) Foreign Application Priority Data

Feb. 3, 2011 (GB) .................................. 1101812.4

(51) Int. Cl.
*H04L 12/26* (2006.01)
*H04W 52/14* (2009.01)
*H04W 52/08* (2009.01)
*H04W 52/16* (2009.01)
*H04W 52/24* (2009.01)
*H04W 52/28* (2009.01)

(52) U.S. Cl.
CPC ............ *H04W 52/146* (2013.01); *H04W 52/08* (2013.01); *H04W 52/16* (2013.01); *H04W 52/241* (2013.01); *H04W 52/245* (2013.01); *H04W 52/286* (2013.01)
USPC .......................................... 370/252; 370/254

(58) Field of Classification Search
CPC . H04W 24/00; H04W 43/50; H04W 43/0852; H04W 43/08; H04B 17/003
USPC ................................... 370/252, 254, 255, 248
See application file for complete search history.

(56) References Cited

U.S. PATENT DOCUMENTS

| | | | |
|---|---|---|---|
| 2005/0239413 A1* | 10/2005 | Wiberg et al. | 455/69 |
| 2008/0032725 A1* | 2/2008 | Usuda et al. | 455/509 |
| 2008/0043681 A1* | 2/2008 | Vimpari et al. | 370/335 |
| 2009/0088178 A1* | 4/2009 | Jugl et al. | 455/453 |
| 2009/0196195 A1* | 8/2009 | Gerstenberger et al. | 370/252 |

FOREIGN PATENT DOCUMENTS

| | | | |
|---|---|---|---|
| GB | 2454065 A | | 5/2009 |
| WO | WO 2010/121635 A1 | | 10/2010 |

OTHER PUBLICATIONS

Combined Search and Examination Report for Great Britain Patent Application No. GB1101812.4, Intellectual Property Office, London, issued Jun. 2, 2011.

\* cited by examiner

*Primary Examiner* — Michael J Moore, Jr.
*Assistant Examiner* — Siren Wei
(74) *Attorney, Agent, or Firm* — Sterne, Kessler, Goldstein & Fox P.L.L.C.

(57) ABSTRACT

A method for managing power control of enhanced dedicated channel (E-DCH) uplink (UL) channels of at least one user equipment (UE) that is located on a femtocell base station (FBS), is provided herein. The method includes calculating, for the UE, a maximum dedicated physical control channel (DPCCH) power level. The method also includes lower, by the FBS, a DPCCH power level for the UE when the actual DPCCH power level is exceeding the maximum DPCCH power level for the UE. The lowering of the DPCCH power level is independent of a signal-to-interference (SIR) target for the FBS.

24 Claims, 4 Drawing Sheets

POWER MANAGEMENT OF USER EQUIPMENT LOCATED ON A FEMTOCELL BASE STATION

CROSS-REFERENCE TO RELATED APPLICATIONS

The present application is a U.S. Nonprovisional Application which claims the benefit of Great Britain Application No. 1101812.4, filed on Feb. 3, 2011, which is incorporated herein by reference in its entirety.

BACKGROUND

1. Field of Disclosure

The present invention relates to wireless communication and in particular to improving throughput and stability of high-speed uplink packet access in femtocell base stations.

2. Related Art

One of the challenges of an uplink channel in a code division multiple access (CDMA) cellular communication system is to maximize the throughput under maximal input level. The input level of the cellular base stations (aka cells) is an important parameter in cellular communication systems as it affects the overall interference originated from the cellular communication devices (aka user equipment, or UE) served by a specified cell, or by one of the neighbouring cells. Additionally, the input level at the cell receiver further affects the cell uplink range, in combination with maximal allowed power level of the transmitters of the UEs.

BRIEF DESCRIPTION OF THE DRAWINGS/FIGURES

Embodiments of the present disclosure are described with reference to the accompanying drawings. In the drawings, like reference numbers indicate identical or functionally similar elements. Additionally, the left most digit(s) of a reference number identifies the drawing in which the reference number first appears.

For a better understanding of embodiments of the invention and to show how the same may be carried into effect, reference will now be made, purely by way of example, using notation of 3GPP UMTS standard, to the accompanying drawings in which like numerals designate corresponding elements or sections throughout. The 3GPP UMTS standard may include, for example, $3^{RD}$ GENERATION PARTNERSHIP PROJECT STANDARD: 3GPP TS 25.101, *User Equipment (UE) Radio Transmission and Reception (FDD)*, version 11.0.0, (2011-2012), and $3^{RD}$ GENERATION PARTNERSHIP PROJECT STANDARD: 3GPP TS 25.102, *User Equipment (UE) Radio Transmission and Reception (TDD)*, version 11.1.0, (2011-2012), each of which is incorporated herein by reference in its entirety.

The present disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE PRESENT DISCLOSURE

One aspect of the invention provides a method for managing power control of an enhanced dedicated channel (E-DCH) uplink (UL) channel for at least one user equipment (UE) that is located on a femtocell base station (FBS). The method includes calculating for the UE a maximum dedicated physical control channel (DPCCH) power level. The method also includes lowering by the FBS a DPCCH power level for the UE when the actual DPCCH power level is exceeding the maximum DPCCH power level for the UE where the lowering of the DPCCH power level is independent of a signal-to-interference (SIR) target for the FBS.

The following Detailed Description refers to accompanying drawings to illustrate exemplary embodiments consistent with the present disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the present disclosure that others can, by applying knowledge of those skilled in relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Conventional Macrocell Base Station System

Figure 1:
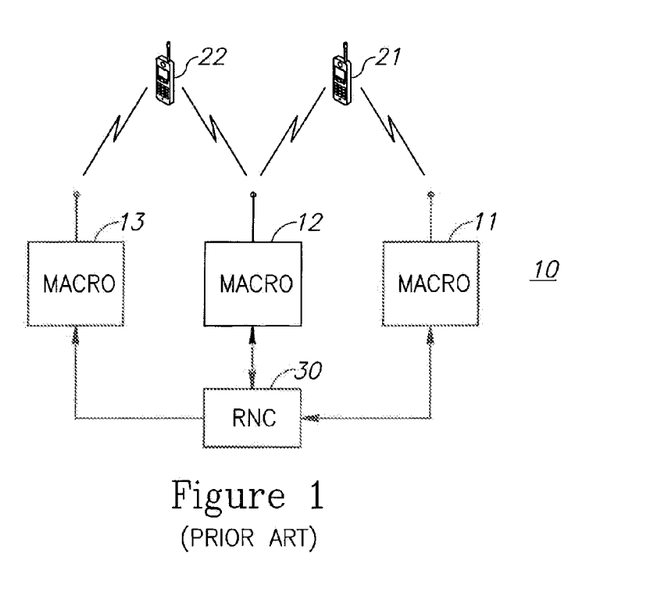
FIG. 1 is a high level schematic block diagram illustrating a conventional macrocell base station system according to the prior art.

FIG. 1 is a high level schematic block diagram illustrating a conventional macrocell base station system according to the prior art. Conventional system 10 includes a plurality of conventional macrocell base stations 11 through 13 which were carefully deployed by the RF engineers according to a predefined deployment plan. Additionally, each one of the conventional macrocell base stations 11 through 13 is in communication and controlled by a conventional Radio Network Controller (RNC) unit which is informed of all power control related data measurements in conventional system 10 and has overall control on the conventional macrocell base station. Furthermore, conventional system 10 is capable of soft handover of the conventional user equipment (UE) 21 through 22 from neighboring conventional macrocell base stations 11 through 13. Due to the three aforementioned features of conventional macrocell base stations, controlling power of uplink channels is significantly less challenging than uplink power control in a femtocell base station which are: (i) independently deployed, (ii) are not connected to a central RNC, and (iii) typically do not employ soft handover.

Overview

The input level at the cell receiver further affects the cell uplink range, in combination with maximal allowed power level of the transmitters of the cellular communication devices. Due to the constraints on the aforementioned input level, several attempts to deal with controlling the input level of the uplink channel in cellular communication systems are known in the art. One known approach is to manage uplink power control vis à vis the respective noise raise. As shall be explained below in an analytical review of the noise raise, it would be impractical to implement such an approach.

For practical reasons, in order to simplify the explanation, and consistent with the femtocells properties, the analysis below is provided under the assumptions of: a single antenna; rake receiver (without interference cancellation); base station without soft handover, and ideal inner loop power control, i.e. the signal to interference (SIR) is equal to SIR target if the combination is feasible.

The UMTS uplink resource distribution is based on the concept of noise raise and power control. Each UE increases its power to the minimal one that guarantees required SNR while the noise consist of the thermal noise, other UEs power (same and other cells) and self-interference mainly due to combined channel profile (including filter).

The power control try to target the DPCCH (pilot) signal to specific SNR, the total (chip) SNR could be therefore calculated as in the following Equation 1, that like all other equation has implicit dependency on time.

In the following Equation 1, the signal to noise ratio (SNR) on an uplink channel is shown (ideal power control is assumed):

$$E_C = E_{dpcch} \cdot \left(1 + \beta_{dch}^2 + \beta_{e-dpcch}^2 + \underbrace{K_{e-dpdch} \cdot \beta_{e-dpdch}^2 + \beta_{hs-dpcch}^2}_{\text{total grunt}}\right) \quad (1)$$

$$\underbrace{\phantom{xxxxxxxxxxxxxxxxxxxxxxxxxxxxxxxxxxxxxxxxxxxxxxxxxx}}_{\beta_{total}^2}$$

$$E_{dpcch} \approx \frac{\text{SIR\_Target} \cdot N_{total}^{ue}}{256}$$

$$SNR \equiv \frac{E_C}{N_{total}^{ue}} \approx \beta_{total}^2 \cdot \frac{\text{SIR\_Target}}{256}$$

Wherein:

$\beta_{dch}$—the DCH channel gain (depend on the selected TFCS)

$\beta_{e-dpcch}$—DPCCH gain, for E-DCH control channel $\beta_{hs-dpcch}$—the HS-DPCCH gain, HS-DSCH return channel gain depend on what is transmitted (ACK/NACK/CQI)

$K_{e-dpdch}$—the equivalent number of E-dpdch codes $\beta_{e-dpdch}$—the E-dpdch gain The total noise and interference each cellular communication device uplink experiences are calculated below in Equation 2.

$$N_{tot}^{ue} = N_0 + \sum_{n \neq ue} E_{chip}(n) + \alpha_{orth} \cdot E_{chip}(ue) \quad (2)$$

$$= I_{total} - (1 - \alpha_{orth}) \cdot E_{chip}(ue)$$

$$I_{total} = 10 \cdot \log10\left(N_0 + \sum E_{chip}(k)\right)$$

$\alpha_{orth}$-orthogonality factor (0- fully orthogonal)

As shown above, the noise is calculated as a summation of noise and interferences originated from all the cellular communication devices (including those served by other I-INB).

The total noise raise approximation is provided below in Equation 3.

$$I_{total} = N_0 + \sum_{all\_ues} EC_{ue} \approx I_{other\_cells} + \sum_{served\ ue} (1 + f_{ue}) \cdot CTIR_{ue} \cdot I_{total} \quad (3)$$

$$NR \equiv \frac{I_{total}}{N_0} \approx \frac{1}{1 - \underbrace{\sum_{ue} (1 + f_{ue}) \cdot CTIR_{ue}}_{\text{Load metric}}}$$

$$CTIR_{ue} \equiv \frac{EC_{ue}}{I_{total}}$$

$I_{other\_cells}$-include other cells interference when all $CTIR_{ue} == 0$

As shown above, the total noise raise is calculated by taking into account only served cellular communication devices and approximating the interference from other cells as linear function of the served cellular communication device. The initial maximal load is set according to a required maximal noise raise.

In balancing the uplink power and respective noise raise, a load factor may be defined, for example, as shown below in Equation 4.

$$LF \equiv \frac{NR-1}{NR} \quad (4)$$

$$NR = \frac{1}{1-LF}$$

$$LF \approx \sum_{ue}(1+f_{ue}) \cdot CTIR_{ue}$$

Figure 2:
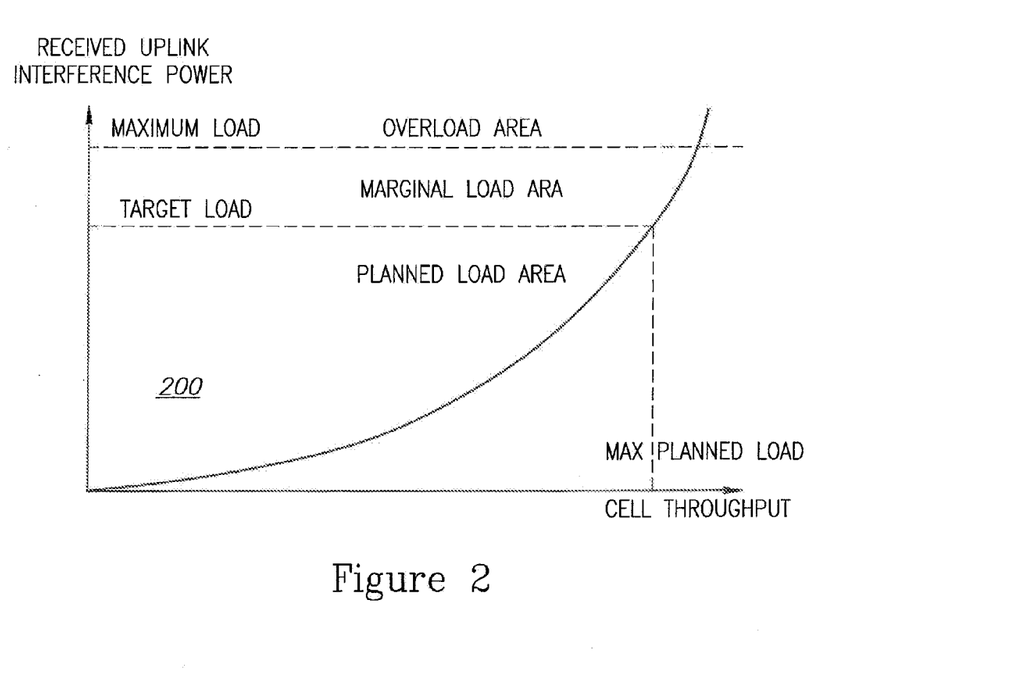
FIG. 2 is a graph illustrating an aspect of a method consistent with an embodiment of the invention.

FIG. 2 is a graph 200 illustrating the received uplink interference power as a function of the cell throughput. As shown above, the load factor (LF) depends on each cellular communication device's total carrier to $I_{totali}$ ratio (CTIR) and the other cells interference coupling. The cell is considered stable (aka combination) if the load factor is strictly less than one. Specifically, this condition further implies that the noise raise is finite.

Further in the analysis, the load factor and the noise raise are mapped into more controllable and observable parameters in a cellular communication system. Equation 5 below shows the relationship between SIR and CTIR, assuming perfect power control. It is noted that the value of 256 is due to the DPCCH spreading factor.

$$SIR_{PC} \approx \beta_{total}^2 \cdot \frac{SIR\_Target}{256}$$

$$EC_{ue} = SIR_{PC} \cdot (I_{total} - (1-\alpha_{ue}) \cdot EC_{ue})$$

$$CTIR_{ue} \equiv \frac{EC_{ue}}{I_{total}} =$$

$$\frac{SIR_{PC}}{(1+SIR_{PC} \cdot (1-\alpha_{ue}))} \approx \frac{\beta_{total}^2 \cdot SIR\_Target}{256 + \beta_{total}^2 \cdot SIR\_Target \cdot (1-\alpha_{ue})}$$

$$SIR_{PC} = \frac{CTIR_{ue}}{1-(1-\alpha_{ue}) \cdot CTIR_{ue}}$$

$SIR_{PC}$—SIR for PC algorithm (demodulation SIR could be lower)

$\alpha_{ue}$—Self interference factor for the $1^{st}$ path

Equation 6 below shows the noise raise (NR) as a function of SIR.

$$NR \approx \frac{1}{1-\sum_{ue}(1+f_{ue}) \cdot CTIR_{ue}} = \quad (6)$$

$$\frac{1}{1-\sum_{ue}(1+f_{ue}) \cdot \frac{SIR_{ue}}{(1+SIR_{ue} \cdot (1-\alpha_{ue}))}}$$

As shown above, in addition to cell interference coupling there is a strong dependency on the cellular communicating device orthogonality factor (a).

Any attempt to implement the aforementioned analysis may be impractical due to several reasons as follows: One reason is that the controller does not have detailed information about the interference from unnerved/uncontrolled cellular communication devices and the relation between the used powers of the served cellular communication devices. In particular it does not know the inter-cell coupling factor and its estimation is quite challenging. Another reason is that the inner loop power control is not ideal. It includes estimation errors signalling errors and inherent delay. Yet another reason is that cellular communication devices change constantly the transmitted data rates (among allowed TFCS). This leads to variation of the ratio between the DPCCH power (controlled by the ULPC) and the total transmit power and hence to fluctuation in the noise rise. This leads to high difficulty to estimate the noise raise/interference level.

Yet another reason is that for high data rate, self-interference could become dominant. The self-interference varies in time due to change in the multipath channel, cellular communication device timing and receiver behaviour.

The aforementioned issues become even more challenging for femtocell base stations. This is due to the fact that femtocell base stations will not necessarily serve all nearby cellular communication devices. This is due to use of CSG (closed subscriber group) or lack to support soft handover. This issue, as well as the deployment scenario, (for example, the distance between the cellular communication device and the base station, use of Omni-directional antenna) make the inter-cell interference scenario more complex.

Following the analysis above pertaining to the practicality of potential solutions to the aforementioned problem, a practical solution is described herein below in some embodiments, in a manner that overcomes the challenges depicted in the aforementioned analysis.

The present invention, in embodiments thereof, overcomes the issues raised above in the background of the related art, while maintaining within a specified reasonable level, the uplink throughput for a standalone femtocell base station. Advantageously, the present invention is specifically beneficial for single antenna base stations (such as femtocell) because such systems may need to work in high load in order to reach high throughput. A further advantage is due to the fact that the inter-cell interference level is less predicted in femtocells than in the macrocells.

Embodiments of the present invention include three aspects, that may operate either separately or in combination thereof. The first aspect include adaptive maximal load setting according to the measured RTWP (Receiver input power). The second aspect includes validating load increase effect prior to sending the grant increase by manipulating the inner loop power control SIR target (try before commit). The third aspect includes modifying the ULPC inner loop to use the DPCCH power on top of the DPCCH SIR target that is already a part of the 3GPP standard.

While the focus of the embodiments of the present invention is on femtocell base station control over E-DCH links, aspects of the invention may be used, with the necessary changes, for DCH channels. It should be noted however, that due to the slow process of radio link reconfiguration, a practical implementation of the invention for DCH channels may pose some technical challenges.

An Exemplary FBS

Figure 3:
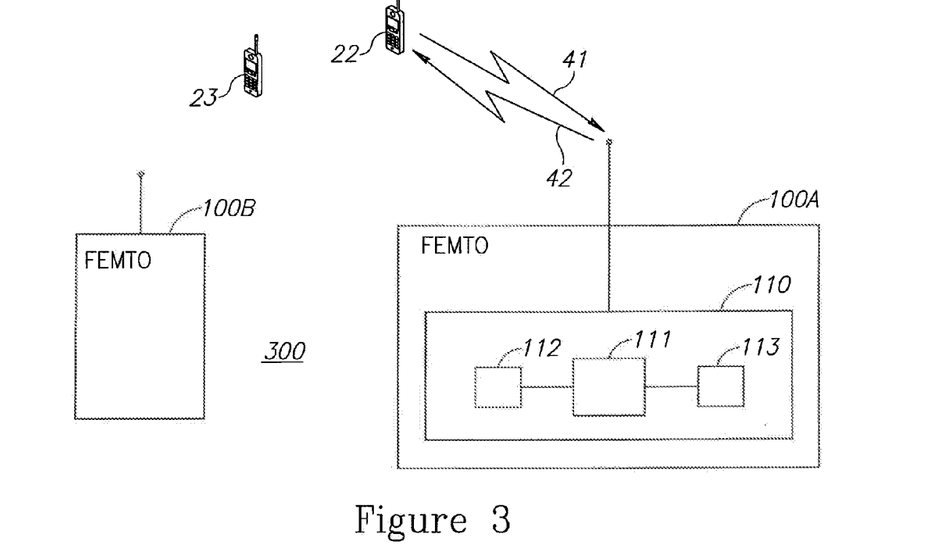
FIG. 3 is a block diagram illustrating the system consistent with an embodiment of the invention.

FIG. 3 is a block diagram illustrating the system consistent with an embodiment of the invention. System 300 includes one or more femtocell base stations such as 100A and 100B. Each femtocell base station 100A includes a power control unit 110 which may include an estimator 113, a calculator 111 and a SIR module 112. Femtocell base station 100A may be in communication with a user equipment (UE) 22 an uplink channel 41 and a down link channel 42. UE 23 may further communicate with neighbouring femtocell base station 100B.

In operation, power control unit 110 calculates, using calculator 111, for each UE 22 through 23, a maximal expected value of a dedicated physical control channel (DPCCH)

power. Then power control unit 110 forces a "down" power control command by femtocell base station 100A on each UE 22 through 23 whose actual received DPCCH power exceeds the calculated maximal DPCCH. Specifically, the forcing of the "down" command is carried out independently of a signal-to-interference (SIR) relation to the SIR target associated with femtocell base station 100A.

Consistent with one embodiment of the invention, the calculated maximum DPCCH power in calculator 111 is based on a calculated maximal target Received Total Wideband Power (RTWP) subtracted by a maximal Chip to DPCCH power ratio, such that each UE 22 through 23 contributes to the total noise raise (NR) up to a maximal allowed value of RTWP.

Consistent with one embodiment of the invention the calculated maximum DPCCH power in calculator 111 is based on measured current RTWP level subtracted by DPCCH target signal to noise ratio (SNR) such that UEs with higher priority or QOS link requirement will satisfy their required SNR long after lower priority fails to satisfy their required DPCCH target SNR.

Consistent with one embodiment of the invention, power control unit 110 further includes an estimator 113 configured to estimate the RTWP measurement period at femtocell base station 100A. Femtocell base station 100A then adapts a maximal load factor based on the RTWP, wherein the load factor is changed dynamically over time based on the RTWP.

Consistent with one embodiment of the invention, power control unit 110 is further configured to reduce the allowed ratios between DPCCH and the total transmitted power of one or more UEs whenever the calculated load exceeds the target load and increasing the ratio only if the total calculated load is below the target load.

Consistent with one embodiment of the invention power control unit 110 is further configured to apply, possibly using SIR module 112, a procedure that include the following stages: (i) changing the SIR target associated with the FBS from an original value to a test value, to emulate the chip SIR change due to the ratio increase (ii) measuring RTWP measurements to detect possible instability; in case of stability, respective grant is sent to the UE and SIR target is changed to the original value; and in case of instability the SIR target is set within a minimal delay to the original value and the grant send is cancelled. Advantageously, and as opposed to macro-cell base stations, the test and quick adjustments is possible due to the nature of the femtocell, which basically enables implemented various functionalities on a single physical unit with minimal communications delay.

Figure 4:
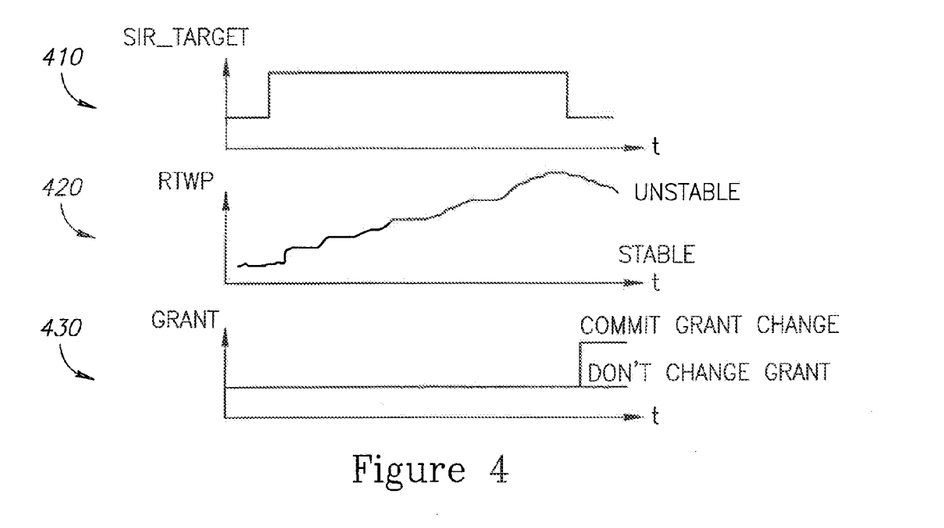
FIG. 4 is a graph illustrating an aspect of a method consistent with an embodiment of the invention.

FIG. 4 is a diagram showing a graph with three sections: SIR_TARGET, RTWP, and GRANTS, all in connection with the tray-before-change feature of the aforementioned system. It can be clearly shown that the TWP is a good indication for the stability of the system, and may be used as a trigger for the change of SIR, provided stability is maintained.

Consistent with one embodiment of the invention, the power control unit 110 is configured such that after reaching maximal grant load, the change may be maintained over a specified period of time, until all of the signalling had been finalized and the grant change is taking effect.

Consistent with one embodiment of the invention, power control unit 110 estimates the receiver input power (RTWP) measurement period. The maximal load factor is then adapted according to the RTWP. This principle is aligned to the NBAP 25.433 standard interface, such as provided by $3^{RD}$ GENERATION PARTNERSHIP PROJECT: *UTRAN Iub Interface Node B Application Part* (*NBAP*) *Signaling*, version 11.0.0, (2011-2012) which is incorporated herein by reference in its entirety, in which base station gets the maximal allowed RTWP.

The adapting of the maximal load factor may be based, at least in part, on blind adaptation that increases and decreases the maximal grand using only the RTWP results. Equation 7 below shows the Max grant reduction (high RTWP).

$$\Delta_{load} = \begin{bmatrix} \Delta_0 & K_2 \cdot MaxRTWP > RTWP \geq K_1 \cdot MaxRTWP \\ \Delta_1 & RTWP \geq K_2 \cdot MaxRTWP \end{bmatrix} \quad (7)$$

$$K_1 = [\text{ten} : 0.8]$$

$$K_2 = [\text{ten} : 2]$$

$$\Delta_0 = [\text{ten} : -0.1]$$

$$\Delta_1 = [\text{ten} : -0.2]$$

Equation 8 below shows maximal grant increase (low RTWP).

$$MaxLF(n + 1) = \min(GlobalMaxLF, MaxLF(n + 1) + \Delta_{load}) \quad (8)$$

$$\Delta_{load} = \begin{bmatrix} \Delta_2 & MinRTWP > RTWP \\ \Delta_3 & K_3 \cdot MaxRTWP \geq RTWP \geq MinRTWP \end{bmatrix}$$

$$\Delta_2 = [\text{ten} : -0.3 \cdot \Delta_0 \approx 0.03]$$

$$\Delta_3 = [\text{ten} : -0.1 \cdot \Delta_0 \approx 0.01]$$

$$K_3 = [\text{ten} : 0.5 \cdot K_1]$$

As shown above, in case of high inter-cell interference factor (f) the RTWP will be higher than expected, so that a reduction is made to the allowed load, which is equivalent to assuming higher value of "f". The change could also take into consideration the actual load so the E-DCH scheduler will not over increase the maximal load in case the system is extremely unloaded.

The concept of load calculation and comparison the target load to maximal adapted threshold mention above could lead to oscillation in particular while dealing with multi-cell environment. The probability of the oscillation could be further be improved by using the test before change mechanism described below. This mechanism employs the inner loop power control SIR_TARGET to emulate the expected chip_SIR change. The idea here is to change the SIR_TARGET of the inner loop PC to emulate the chip SIR change due to the new grant as depicted in equation 8aa below. The original total could be according to the actual used E-TFCI and TFCI or in preferred embodiment the actual values used, and the new total should be according to the maximal allowed grant.

$$\text{NEW\_SIR} = \text{OLD\_SIR} + 10 \cdot \log10\left(\frac{\text{new}\_\beta_{total}}{\text{current}\_\beta_{total}}\right) \quad (8aa)$$

Following the SIR_TARGET change the E-DCH scheduler will follow short term RTWP measurements to detect possible instability. In case that the system seems to be stable the E-DCH scheduler will send the grant and change the SIR_TARGET to the original level, in case instability is detected the SIR target could be returned with minimal delay to the original value and therefore return the system into stable condition.

After reaching maximal grant load, the change may be maintained from a specified period of time, until all the signalling had been finalized and the grant change is taking effect. Typically, this would take about 100 msec for E-DCH scheduler for 10 msec TTI (and much more for DCH links).

The value of both maximal and minimal RTWP could be dependent on at least one of: the signalled value, offset values from the measured power level, calculation based on the expected RF behaviour and the like.

As indicated above, a femtocell base station operating with high load may be prone to instant instability (wherein load factor may, for example, exceed 1) from time to time. One of the reasons for such instant instability may include changes in the orthogonality factor $(\alpha)i$, the signalling error and the like.

One of the undesirable effects of instant instability is a very rapid power increase (up to 15 dB per 10 msec). Such fast power change may result in the femtocell base station have its hardware reconfigured and may further cause the cellular communication devices reach their maximal transmitting power.

Consistent with one embodiment of the invention and in order to handle the aforementioned instant instabilities, the inner loop power control may be controlled as detailed below. The E-DCH scheduler or RRM unit may calculate, for each cellular communication device, the maximal expected value of the DPCCH power. Then, the power control should force "down" command if the DPCCH power exceeds the maximal DPCCH power it receives, regardless to the SIR and SIR target. Optionally, the DOWN is forced only if the total gain change over a period is over a specified value that may be set to predefined level such as −5 dB or any other negative value.

Consistent with one embodiment of the invention, the maximum DPCCH power threshold could be set using several inputs. One such input may be the maximal target RTWP (signal from higher layer) subtracted by maximal Chip to DPCCH power (plus margin). This option allows each UE to contribute to the total NR up to the maximal RTWP. Another such input may be the current RTWP level plus some offset subtracted by DPCCH target SNR (at chip level). This option allows that users at negative EC/Ntotal could satisfy their SIR target as long as the input signal remains within range.

Figure 5:
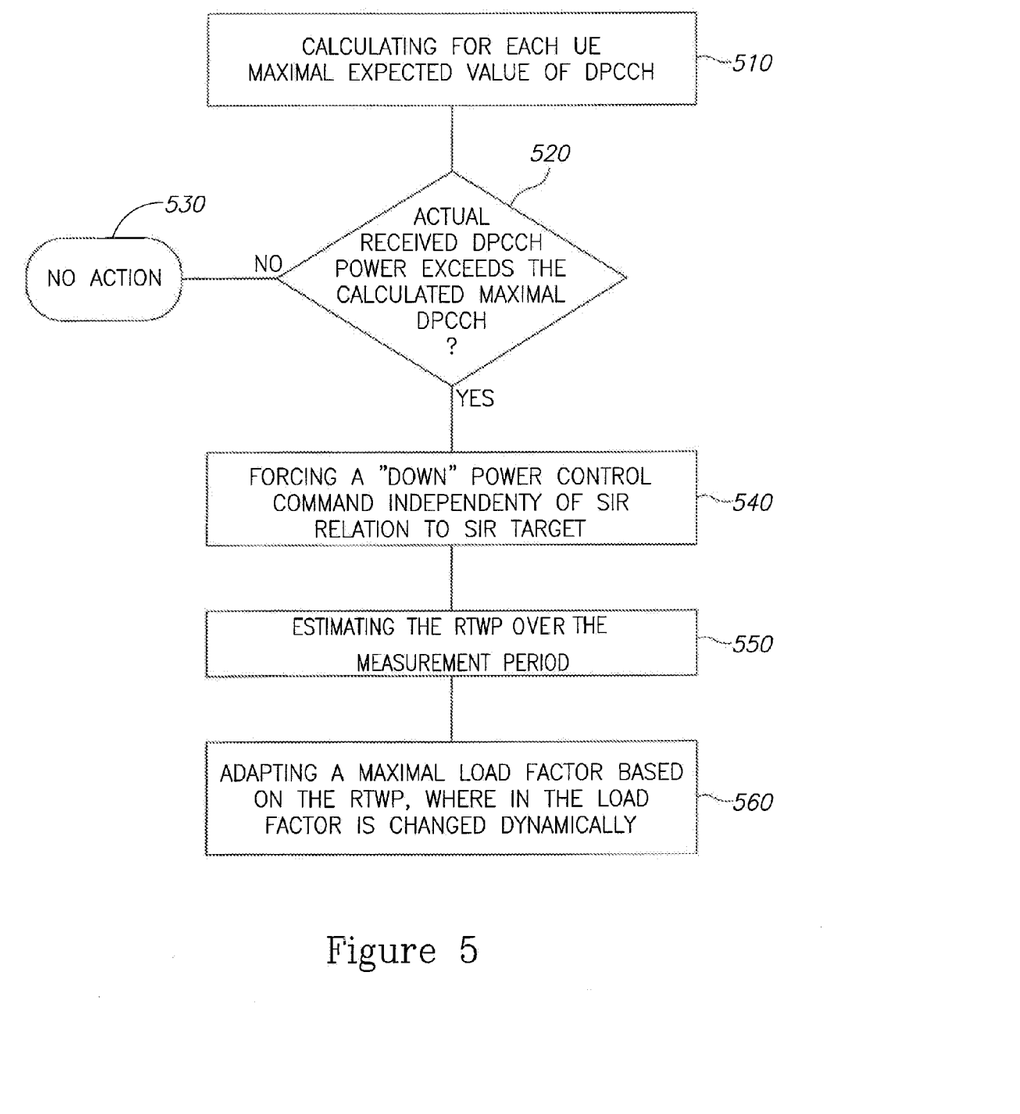
FIG. 5 is a high level flowchart diagram illustrating an aspect of a method consistent with an embodiment of the invention.

FIG. 5 is a high level flowchart diagram illustrating an aspect of a method consistent with an embodiment of the invention. The method comprising: calculating, for each one of the UEs, a maximal expected value of a dedicated physical control channel (DPCCH) power; forcing a "down" power control command by the FBS on each one of the UE whose actual received DPCCH power exceeds the calculated maximal DPCCH, wherein the forcing of the "down" command is carried out independently of a signal-to-interference (SIR) relation to the SIR target associated with the femtocell base station.

The aforementioned feature constitutes an addition on top of the inputs detailed and defined in the 3GPP standard, according to which, only the comparison between the estimated and target SIR are being used.

FIG. 5 is a flowchart of some embodiments according to the invention. The method begins with step 510 with calculating for the UE, a maximal expected value of DPCCH.

Following the completion of step 510, the method continues with step 520 in determining whether the actual DPCCH power level exceeds the maximum DPCCH power level.

If the actual DPCCH power level does exceed the maximum DPCCH power level in step 520, then the method continues with step 540 in forcing a "down" power control command independent the SIR relation to the SIR target.

Following the completion of step 540, the method continues with step 550 in estimating the RTWP over the measurement period Following the completion of step 550, the method continues with step 560 in adapting a maximal load factor based on the RTWP where the load factor is changed minimally.

Figure 6:
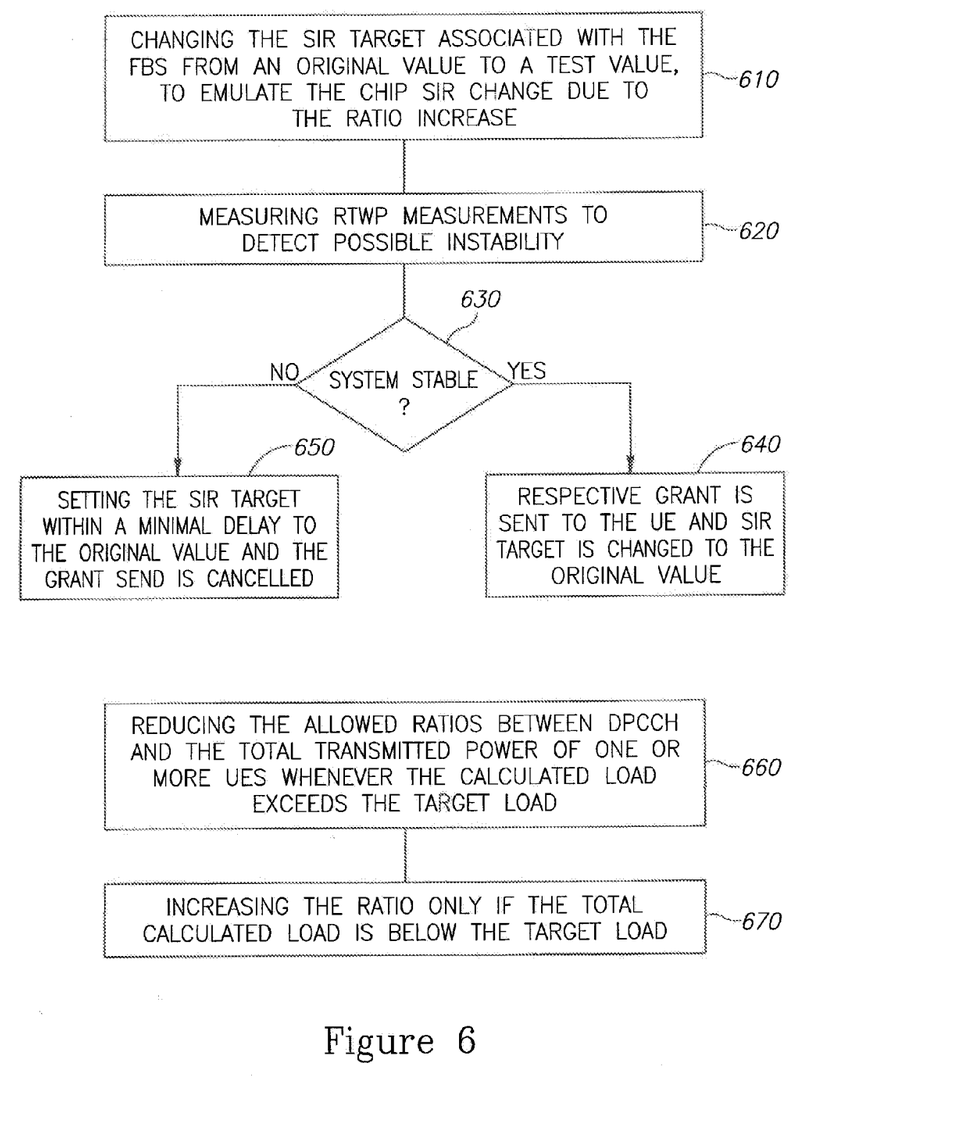
FIG. 6 is a high level flowchart diagram illustrating an aspect of a method consistent with an embodiment of the invention.

FIG. 6 is a flowchart of some embodiments according to the invention. The method begins with step 610 with changing the SIR target associated with the femtocell base station from an original value to a test value to emulate the chip SIR change due to the ratio increase.

Following the completion of step 610, the method continues with step 620 in measuring RTWP measurements to detect possible instability.

Following the completion of step 620, the method continues with step 630 in checking whether the system is stable. For example, the RTWP level changes may be checked for stability.

If in step 630 it is determined that the system is not stable, the method proceeds to step 650 in setting the SIR target within a minimal delay to the original value and the grant send is cancelled 650;

If in step 630 it is determined that the system is stable, the method proceeds to step 640 in sending the respective grant to the UE and the SIR target is changed to the original value.

Optionally, in step 660, the allowed ratios between DPCCH and the total transmitted power of one or more UEs is reduced whenever the calculated load exceeds the target load.

Optionally, in step 670, the ratio is increased only if the total calculated load is below the target load.

CONCLUSION

It is to be appreciated that the Detailed Description section, and not the Abstract section, is intended to be used to interpret the claims. The Abstract section may set forth one or more, but not all exemplary embodiments, of the present disclosure, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the present disclosure. Thus the present disclosure should not be limited by any of the above-described exemplary embodiments, but should be defined only in accordance with the following claims and their equivalents.

What is claimed is:

1. A method for managing power control of an enhanced dedicated channel (E-DCH) uplink (UL) channel for user equipment (UE) that is located on a femtocell base station (FBS), the method comprising:

calculating, by the FBS, a first dedicated physical control channel (DPCCH) power level based on a difference between a Received Total Wideband Power (RTWP) level and a chip to DPCCH power ratio; and lowering, by the FBS, a second DPCCH power level to the UE when the second DPCCH power level exceeds the calculated first DPCCH power level.

2. The method of claim 1, wherein the first DPCCH power level is further based on a difference between a measured RTWP value and a DPCCH signal to noise ratio (SNR).

3. The method of claim 1, further comprising:
estimating an RTWP measurement period at the FBS;
measuring an RTWP level over the RTWP measurement period at the FBS; and
adapting a load factor based on the measured RTWP level.

4. The method of claim 1, further comprising:
reducing an allowed ratio for the first DPCCH power level and a total transmitted power level for the UE when a target load is exceeded by a calculated load; and
increasing the allowed ratio when the calculated load is exceeded by the target load.

5. The method of claim 4, further comprising:
changing a signal-to-interference (SIR) target for the FBS from a first value to a second value, wherein a transition in a chip SIR is emulated due to increasing the allowed ratio; and
measuring the RTWP level to detect instability.

6. The method of claim 5, wherein the measuring comprises:
changing the SIR target to the first value when the instability is not detected.

7. The method of claim 3, wherein the adapting of the load factor is based on a blind adaptation that adjusts the RTWP level based on the measured RTWP level over the RTWP measurement period.

8. The method of claim 4, further comprising:
adjusting the target load when a threshold is exceeded by the RTWP level or the second DPCCH power level.

9. The method of claim 8, wherein the UE is from among a plurality of UEs, the method further comprising:
adjusting the target load of a first UE of the plurality of UEs having a first priority before a second UE of the plurality of UEs having a second priority, wherein the first priority is higher than the second priority.

10. A femtocell base station (FBS), comprising:
a calculator configured to calculate, for user equipment (UE) that is located on the FBS, a first dedicated physical control channel (DPCCH) power level based on a difference between a Received Total Wideband Power (RTWP) level and a chip to DPCCH power ratio; and
a power control unit configured to:
manage power control of an enhanced dedicated channel (E-DCH) uplink (UL) channel for the UE; and
lower a second DPCCH power level to the UE when the second DPCCH power level exceeds the calculated first DPCCH power level.

11. The FBS of claim 10, wherein the calculator is configured to calculate the first DPCCH power level based on a difference between a measured RTWP value and a DPCCH signal to noise ratio (SNR).

12. The FBS of claim 10, further comprising:
an estimator configured to estimate an RTWP measurement period at the FBS.

13. The FBS of claim 12, wherein the power control unit is further configured to:
measure an RTWP level over the RTWP measurement period; and
adapt a load factor based on the measured RTWP level.

14. The FBS of claim 10, wherein the power control unit is further configured to:
reduce an allowed ratio for the first DPCCH power level and a total transmitted power level for the UE when a target load is exceeded by a calculated load; and
increase the allowed ratio when the calculated load is exceeded by the target load.

15. The FBS of claim 14, further comprising:
a signal-to-interference (SIR) module configured to:
change a SIR target for the FBS from a first value to a second value; and
measure the RTWP level to detect instability.

16. The FBS of claim 15, wherein the SIR module is further configured to:
change the SIR target to the first value when the instability is not detected.

17. The FBS of claim 13, wherein the power control unit is further configured to adapt the load factor based on a blind adaptation that adjusts the RTWP level based on the measured RTWP level over the RTWP measurement period.

18. The FBS of claim 14, wherein the power control unit is further configured to adjust the target load when a threshold is exceeded by the RTWP level or the second DPCCH power level.

19. The method of claim 1, wherein the calculated first DPCCH power level is a maximum DPCCH power level.

20. The method of claim 1, wherein the RTWP level is a maximum RTWP level and the chip to DPCCH power ratio is a maximum chip to DPCCH power ratio.

21. The method of claim 1, wherein the lowering of the second DPCCH power level is independent of a signal-to-interference (SIR) target for the FBS.

22. The FBS of claim 10, wherein the calculated first DPCCH power level is a maximum DPCCH power level.

23. The FBS of claim 10, wherein the RTWP level is a maximum RTWP level and the chip to DPCCH power ratio is a maximum chip to DPCCH power ratio.

24. The FBS of claim 10, wherein the lowering of the second DPCCH power level is independent of a signal-to-interference (SIR) target for the FBS.

* * * * *

UNITED STATES PATENT AND TRADEMARK OFFICE
CERTIFICATE OF CORRECTION

PATENT NO. : 8,958,321 B2  
APPLICATION NO. : 13/363593  
DATED : February 17, 2015  
INVENTOR(S) : Levy et al.

Page 1 of 1

It is certified that error appears in the above-identified patent and that said Letters Patent is hereby corrected as shown below:

Title Page, Foreign Patent Documents, Item (56), please replace "GB   2454065   A   5/2009" with --GB   2454865   A   5/2009--.

Signed and Sealed this  
Second Day of June, 2015

Michelle K. Lee  
*Director of the United States Patent and Trademark Office*